United States Patent
Barsness et al.

(10) Patent No.: US 8,682,875 B2
(45) Date of Patent: Mar. 25, 2014

(54) DATABASE STATISTICS FOR OPTIMIZATION OF DATABASE QUERIES CONTAINING USER-DEFINED FUNCTIONS

(75) Inventors: Eric Lawrence Barsness, Pine Island, MN (US); Brian Robert Muras, Rochester, MN (US); Paul Stuart Nelsestuen, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/877,972

(22) Filed: Oct. 24, 2007

(65) Prior Publication Data

US 2009/0112799 A1    Apr. 30, 2009

(51) Int. Cl.
G06F 7/00 (2006.01)
G06F 17/00 (2006.01)
G06F 17/30 (2006.01)

(52) U.S. Cl.
USPC .......................................... 707/702; 707/718

(58) Field of Classification Search
USPC .............................. 707/3, 702, 718
See application file for complete search history.

(56) References Cited

U.S. PATENT DOCUMENTS

| | | | |
|---|---|---|---|
| 6,353,818 B1 * | 3/2002 | Carino, Jr. | 1/1 |
| 6,763,359 B2 * | 7/2004 | Lohman et al. | 707/718 |
| 6,775,831 B1 * | 8/2004 | Carrasco et al. | 718/100 |
| 2006/0031200 A1 * | 2/2006 | Santosuosso | 707/3 |
| 2006/0041544 A1 * | 2/2006 | Santosuosso | 707/4 |
| 2008/0270392 A1 * | 10/2008 | Day et al. | 707/5 |
| 2008/0275858 A1 * | 11/2008 | Day et al. | 707/3 |

OTHER PUBLICATIONS

U.S. Appl. No. entitled, "Generating Statistics for Optimizing Database Queries Containing User-Defined Funcitons," filed Oct. 25, 2007, U.S. Appl. No. 11/923,763.
Office Action History of U.S. Appl. No. 11/923,763, dates ranging from Feb. 12, 2010 to Jul. 26, 2010.

* cited by examiner

*Primary Examiner* — Etienne Leroux
*Assistant Examiner* — Jared Bibbee
(74) *Attorney, Agent, or Firm* — Patterson & Sheridan LLP

(57) ABSTRACT

Embodiments of the invention provide techniques for generating statistics for optimizing database queries containing user-defined functions (UDFs). In general, the statistics may be generated based on output values produced during past executions of a UDF. The statistics may also be generated based on input values received during past executions of the UDF. Additionally, the statistics may include input and output value pairs, such that a UDF output may be determined based on a UDF input. The generated statistics may be used by a query optimizer to determine an efficient query plan for executing the database query.

21 Claims, 7 Drawing Sheets

| UDF ID | OUTPUT CARDINALITY | INPUT CARDINALITY |
|---|---|---|
| UDF_1 | 52 | 64 |
| UDF_2 | 7 | 12 |
| UDF_3 | 311 | 365 |
| UDF_4 | 25 | 50 |
| ... | ... | ... |
| UDF_N | 180 | 229 |

CARDINALITY TABLE FOR ALL UDFS

FIG. 2A

| UDF ID | INPUT VALUE | OUTPUT VALUE |
|---|---|---|
| UDF_1 | 101 | AAA |
| UDF_1 | 103 | AAB |
| UDF_1 | 104 | AAD |
| UDF_1 | 107 | ABA |
| ... | ... | ... |
| UDF_1 | 373 | XYZ |

INPUT/OUTPUT HASH TABLE FOR ALL UDFS

FIG. 2B

| RANK 232 | OUTPUT VALUE 234 | NUMBER OF INSTANCES 236 |
|---|---|---|
| 1 | AAA | 742 |
| 2 | AAB | 615 |
| 3 | AAD | 603 |
| 4 | ABA | 575 |
| ... | ... | ... |
| 100 | XYZ | 38 |

OUTPUT FVL TABLE FOR A GIVEN UDF 239

FIG. 2C

| RANGE 242 | NUMBER OF INSTANCES 244 |
|---|---|
| 1-10 | 452 |
| 11-20 | 507 |
| 21-30 | 319 |
| 31-40 | 225 |
| ... | ... |
| 91-100 | 198 |

OUTPUT HISTOGRAM TABLE FOR A GIVEN UDF 249

FIG. 2D

| UDF ID | AVERAGE RUN TIME | AVERAGE IO NUMBER | AVERAGE CPU SECONDS | AVERAGE MEMORY USE |
|---|---|---|---|---|
| UDF_1 | 22 | 66 | 18 | 512 |
| UDF_2 | 7 | 32 | 3 | 128 |
| UDF_3 | 11 | 45 | 7 | 256 |
| UDF_4 | 25 | 79 | 21 | 384 |
| ... | ... | ... | ... | ... |
| UDF_N | 18 | 57 | 13 | 256 |

PERFORMANCE STATISTICS TABLE FOR ALL UDFS

FIG. 2E

DATABASE STATISTICS FOR OPTIMIZATION OF DATABASE QUERIES CONTAINING USER-DEFINED FUNCTIONS

BACKGROUND OF THE INVENTION

1. Field of the Invention

The invention generally relates to computer database systems. More particularly, the invention relates to techniques for optimization of database queries containing user-defined functions.

2. Description of the Related Art

Databases are well known systems for storing, searching, and retrieving information stored in a computer. One type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to form a new table returned as a set of query results.

A query of a relational database may specify which columns to retrieve data from, how to join the columns together, and conditions (predicates) that must be satisfied for a particular data item to be included in a query result table. Current relational databases require that queries be composed in query languages. A widely used query language is Structured Query Language (SQL). However, other query languages are also used.

Once composed, a query is executed by the DBMS. Typically, the DBMS interprets the query to determine a set of steps (hereafter referred to as a "query plan") that must be carried out to execute the query. However, in most cases, there are alternative query plans that can be carried out to execute a given query. Thus, the DBMS often includes a query optimizer, which selects the query plan that is likely to be the most efficient (i.e., requiring the fewest system resources, such as processor time and memory allocation).

SUMMARY OF THE INVENTION

One embodiment of the invention provides a computer-implemented method for selecting a query plan for executing a database query containing a user-defined function, comprising: receiving the database query containing the user-defined function; retrieving one or more predefined statistics describing the user-defined function, wherein the one or more predefined statistics are based at least on output values of previous instances of executing the user-defined function; selecting, based at least on the one or more predefined statistics, a query plan for executing the database query; and outputting the selected query plan.

Another embodiment of the invention provides a computer readable storage medium containing a program which, when executed, performs an operation.

The operation comprises: receiving the database query containing the user-defined function; retrieving one or more predefined statistics describing the user-defined function, wherein the one or more predefined statistics are based at least on output values of previous instances of executing the user-defined function; selecting, based at least on the one or more predefined statistics, a query plan for executing the database query; and outputting the selected query plan.

Yet another embodiment of the invention includes a system, comprising: a database; a processor; and a memory containing a program, which when executed by the processor is configured to provide a query plan for executing a database query containing a user-defined function. The program is configured to: receive the database query containing the user-defined function; retrieve one or more predefined statistics describing the user-defined function, wherein the one or more predefined statistics are based at least on output values of previous instances of executing the user-defined function; select, based at least on the one or more predefined statistics, a query plan for executing the database query; and output the selected query plan.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2E illustrate conceptual views of statistics tables for user-defined functions contained in database queries, according to one embodiment of the invention.

DETAILED DESCRIPTION OF THE PREFERRED EMBODIMENTS

Figure 1:
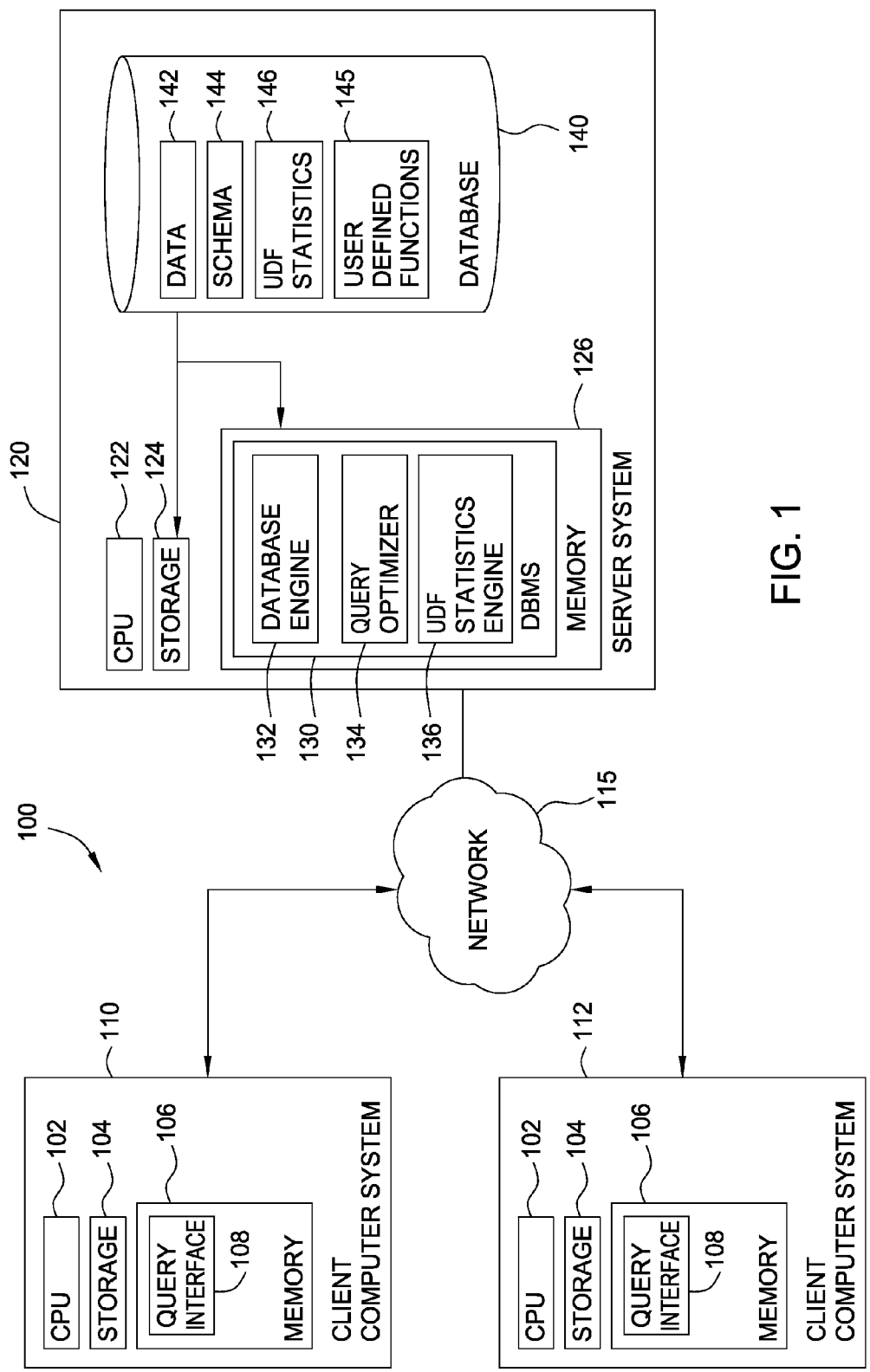
FIG. 1 is a block diagram illustrating a network environment, according to one embodiment of the invention.

Query optimizers typically operate by evaluating database statistics, including column statistics. That is, the query plan is selected based on statistical characteristics of the data in the fields (i.e., columns) required for the query. However, column statistics are usually not suitable for optimizing queries including user-defined functions (UDFs). UDFs are customized functions that can be evaluated in query statements, thus extending the built-in functionality of the database. Since UDFs contain non-standard functionality, the query execution and query results cannot be predicted with statistics describing the underlying columns. Thus, conventional query optimizers may select inefficient query plans for executing queries containing UDFs. Such inefficient query plans may require execution times many times longer than if an efficient query plan was selected.

Embodiments of the invention provide techniques for generating statistics for optimizing database queries containing UDFs. In general, the statistics may be generated based on output values produced during past executions of a UDF. The statistics may also be generated based on input values received during past executions of the UDF. Additionally, the statistics may include input and output value pairs, such that a UDF output may be determined based on a UDF input. The statistics may be used by a query optimizer to determine an efficient query plan for executing the database query.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; and (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet. The client computer systems 110 and 112 are also shown to include a query tool 108. In one embodiment, the query tool 108 is software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server 120 includes a processor 122, storage 124, memory 126, a database 140, and a database management system (DBMS) 130. The database 140 includes data 142, schema 144, user-defined functions (UDFs) 145, and UDF statistics 146. The data 142 represents the substantive data stored by the database 140. The schema 144 represents the structure of the elements of the database 140 (i.e., tables, fields, keys, views, indexes, etc.). The UDFs 145 are customized functions that can be evaluated in query statements, thus extending the built-in functionality of the DBMS 130. The UDF statistics 146 may include metadata describing characteristics of the UDFs 145. Some examples of UDF statistics 146 include frequent values list (FVL) statistics, cardinality statistics, histogram statistics, performance statistics, and the like. The UDF statistics 146 are described in further detail below.

The DBMS 130 provides a software application used to organize, analyze, and modify information stored in the database 140. The DBMS 130 includes a query engine 132, a query optimizer 134, and a UDF statistics engine 136. The query engine 132 may be configured to process database queries submitted by a requesting application (e.g., a query generated using query tool 108) and to return a set of query results to the requesting application. The query optimizer 134 may be configured to select an efficient query plan, or series of executed instructions, for executing a query. The query optimizer 134 may select an efficient query plan by determining which query plan is likely to require the fewest system resources (e.g., processor time, memory allocation, etc.).

In one embodiment, the query optimizer 134 may be configured to optimize queries containing UDFs 145 by utilizing the UDF statistics 146. More specifically, the UDF statistics 146 may be used by the query optimizer 134 to evaluate characteristics of UDFs 145, thus enabling a selection of an efficient query plan for executing a query containing a UDF 145.

In one embodiment, the UDF statistics engine 136 may be configured to generate and manage the UDF statistics 146. Optionally, the UDF statistics engine 136 may also be configured to display the UDF statistics 146 in a graphical interface (not shown). The UDF statistics engine 136 may generate a UDF statistic 146 based on output values produced during past executions of a UDF 145. Additionally, the UDF statistics engine 136 may be configured to generate a UDF statistic 146 based on input values received by the UDF 145. Further, the UDF statistic 146 may be configured as a hash table of input and output values for the UDF 145. Thus, in the situation that previously-used input values are again input to the UDF 145, the results may be retrieved from the UDF statistics 146 without having to execute the UDF 145.

In one embodiment, the UDF statistics 146 may include an output cardinality statistic, meaning the number of distinct values returned by a particular UDF 145. The output cardinality may be used to compute the selectivity of the UDF. Selectivity is a measure for how many records will be retrieved for a given value of an attribute, and may be one of the factors used by the query optimizer 134. Additionally, the UDF statistics 146 may include an input cardinality statistic, meaning the number of distinct values used as inputs by a particular UDF. The input cardinality may also be used by the query optimizer 134.

FIG. 2A illustrates an exemplary cardinality table 210 for multiple UDFs 145 of the database 140, according to one embodiment of the invention. As shown, the cardinality table 210 includes a UDF ID column 212, an OUTPUT CARDINALITY column 214, and an INPUT CARDINALITY column 216. In this example, the cardinality table 210 includes N rows, with each row storing cardinality values for a different UDF 145. For the sake of clarity, multiple rows of the cardinality table 210 are represented by a single row 219.

In one embodiment, the UDF statistics 146 may include input-output hash tables configured to store pairs of inputs and outputs corresponding to a particular UDF. In the case of UDFs that do not have excessively large input or output cardinalities (e.g., more than one million unique values), it may be more efficient to configure the query optimizer 134 to retrieve UDF output values from an input/output hash table, rather than executing the UDF itself.

FIG. 2B illustrates an exemplary input/output hash table 220 for multiple UDFs 145 of the database 140, according to one embodiment of the invention. As shown, the input/output hash table 220 includes a UDF ID column 222, an INPUT VALUE column 223, and an OUTPUT VALUE column 224. In this example, the input/output hash table 220 includes N rows, with each row storing a different pair of input and output value for a given UDF 145. For the sake of clarity, multiple rows of the hash table 220 are represented by a single row 229.

In one embodiment, the UDF statistics 146 may include a frequent values list (FVL) table for output values of the UDFs 145. A FVL table may store a predefined number of the most common output values of the UDFs 145. Optionally, the UDF statistics 146 may include a histogram table for the output values of the UDFs 145. A histogram table may indicate the proportion of output values of the UDF 145 that fall into each of several specified range categories. Either a FVL table or a histogram table may be used by the query optimizer 134 to determine the likelihood of receiving a particular value from the UDF 145. For example, consider the following SQL query:

SELECT * FROM X WHERE MyUDF(X.Col1)>236

In this example, the query predicate "MyUDF(X.Col1)>236" may be evaluated by the query optimizer 134 using an FVL table in order to determine the likelihood that the user-defined function "MyUDF" will return output values larger than the literal "236."

FIG. 2C illustrates an exemplary FVL table 230 for a given UDF 145, according to one embodiment of the invention. As shown, the FVL table 230 includes a RANK column 232, an OUTPUT VALUE column 234, and a NUMBER OF INSTANCES column 236. The rows of the FVL table 230 correspond to, in descending rank (i.e., number of instances), the most frequent output values of a given UDF 145. In one embodiment, the FVL data for each UDF may be stored in a separate FVL table 230. For example, the FVL table 230 illustrated in FIG. 2C stores the 100 most frequent output values produced by a given UDF 145. For the sake of clarity, the rows 5-99 of the FVL table 230 are represented by a single row 239. Alternatively, FVL data for all UDFs 145 of the database 140 may be stored in a single FVL table 230 configured with a column to identify the corresponding UDF 145.

FIG. 2D illustrates an exemplary histogram table 240 for a given UDF 145, according to one embodiment of the invention. As shown, the histogram table 240 includes a RANGE column 242 and a NUMBER OF INSTANCES column 244. The rows of the histogram table 240 correspond to defined range categories for classifying the output values of a given UDF 145. In one embodiment, the histogram data for each UDF may be stored in a separate histogram table 240. For example, the histogram table 240 illustrated in FIG. 2D stores histogram data for output values produced by a given UDF 145. For the sake of clarity, multiple rows of the histogram table 240 are represented by a single row 249. Alternatively, histogram data for all UDFs 145 of the database 140 may be stored in a single histogram table 240 configured with a column to identify the corresponding UDF 145.

In one embodiment, the UDF statistics 146 may include performance statistics describing aspects of system performance during the execution of a particular UDF 145. The performance statistics may be used by the query optimizer 134 to determine an efficient query plan. For example, such performance statistics may be related to run time (e.g., average run time, maximum run time, standard deviation of run time, etc.), input/output (IO) operations (e.g., average number of IOs, maximum number of IOs, comparison of synchronous vs. asynchronous IOs, etc.), CPU time (e.g., average CPU seconds, maximum CPU seconds, etc.), memory requirements (e.g., average memory requirement per UDF, maximum memory requirement per UDF, total memory required, stack memory required, data memory required, etc.), and the like.

FIG. 2E illustrates an exemplary performance statistics table 250 for multiple UDFs 145 of the database 140, according to one embodiment of the invention. As shown, the performance statistics table 250 includes a UDF ID column 252, an AVERAGE RUN TIME column 253, an AVERAGE IO NUMBER column 254, an AVERAGE CPU SECONDS column 255, and an AVERAGE MEMORY USE column 256. In this example, the performance statistics table 250 includes N rows, with each row storing performance statistics for a different UDF 145. For the sake of clarity, multiple rows of the performance statistics table 250 are represented by a single row 259.

In one embodiment, the UDF statistics 146 may include statistics describing external factors affecting the execution of a particular UDF 145. For example, the UDF statistics 146 may be configured to describe characteristics of the UDF 145 when executed as part of a query composed by a particular user. It is contemplated that queries composed by different users may have unique characteristics (e.g., data sources, conditionals, etc.) that may affect query optimization. Thus, it may be beneficial to correlate the UDF statistics 146 according to the identity or job function of a user requesting a query. In addition, the UDF statistics 146 may be correlated to external factors such as a program or system triggering the query execution, the date of execution (e.g., end of month processing), the number of external jobs running on a host system, and the like.

In one embodiment, the UDF statistics 146 may be classified according to one or more sources of data inputs to a particular UDF 145. For example, consider a case where a given UDF 145 only receives inputs from two different tables of the database 140. In such a case, the UDF statistics 146 may be split into two groups, each dedicated for use with queries of the respective table. This approach may result in UDF statistics 146 that more accurately predict the behavior of the UDF 145, and may thus result in more efficient query plans.

In one embodiment, the UDF statistics 146 may be initialized by processing the UDF 145. This process may be required if a UDF 145 has not been executed enough times to establish valid UDF statistics 146. Thus, the UDF statistics engine 136 may be configured to execute the UDF 145 solely for the purpose of building up a robust set of UDF statistics 146. The UDF 145 may be executed using typical input values of the database 140, such as columns that are frequently-accessed by other UDFs 145. Additionally, the UDF 145 may be executed using test data defined for the purpose of establishing valid UDF statistics 146.

One of skill in the art will recognize that FIGS. 1 and 2 are included for illustrative purposes only, and are not limiting of the invention. While the above examples are described in terms of database tables, they may also be embodied in other forms, for instance XML data structures. Also, it is contemplated that the above-described embodiments, in addition to being used independently, may also be used in combination with each other. In one example, the use of the input/output hash table 220 may depend on whether the input and/or output cardinality is below some predefined storage limit. In another example, the functions of the input/output hash table 220 and the FVL table 230 may be combined into a single data structure. This and other combinations may be configured to suit particular situations, and are thus contemplated to be in the scope of the invention.

Figure 3:
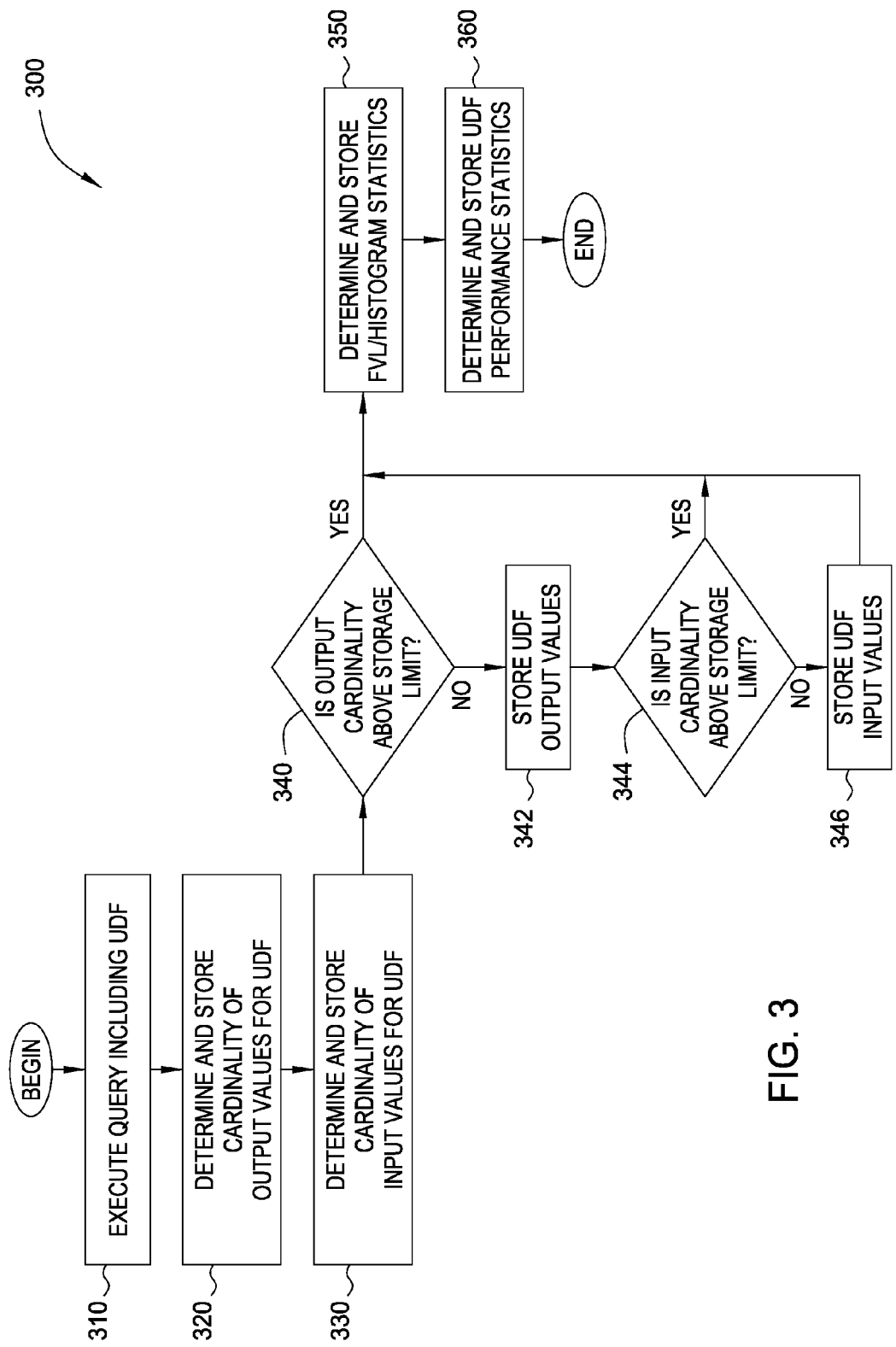
FIG. 3 is a flow diagram illustrating a method for generating statistics for user-defined functions contained in database queries, according to one embodiment of the invention.

FIG. 3 is a flow diagram illustrating a method 300 for generating statistics for UDFs contained in database queries, according to one embodiment of the invention. Generally, the method 300 may be performed each time a database query containing a UDF is executed, thus generating UDF statistics that reflect the historical behavior of the UDF. Persons skilled in the art will understand that, even though the method is described in conjunction with the systems of FIGS. 1 and 2A-2E, any system configured to perform the steps of method 300, in any order, is within the scope of the present invention.

The method 300 begins at step 310, when a database query including a user-defined function (UDF) is executed. For example, a query including a UDF may be created by a user interacting with a query tool 108, and may be executed by a DBMS 130 on a server system 120. At step 320, the cardinality of the UDF output values may be determined and stored. At step 330, the cardinality of the UDF input values may be determined and stored. The steps 320 and 330 may be performed, for example, by the UDF statistics engine 136 illustrated in FIG. 1. The resulting cardinalities may be stored, for example, in the cardinality table 210 illustrated in FIG. 2A.

At step 340, it is determined whether the output cardinality is above a predefined storage limit. That is, whether the number of unique output values is larger than a predefined maximum number of records which are desired to be stored. The storage limit may be predefined based on, for example, a cost/benefit analysis of storage requirements versus improved query optimization resulting from an increased number of stored output values. If the output cardinality is above the storage limit, the method 300 continues at step 350. Otherwise, the method 300 continues at step 342, where the UDF output values may be stored. For example, in the case of a UDF having an output value cardinality below a storage limit (e.g., less than 100), all output values may be stored for later use. After step 342, the method 300 continues at step 344, where it is determined whether the input cardinality is above a predefined storage limit. The storage limit may be predefined based on, for example, a cost/benefit analysis of storage requirements versus improved query optimization resulting from an increased number of stored input values. If the input cardinality is above the storage limit, the method 300 continues at step 350. Otherwise, the method 300 continues at step 346, where the UDF input values may be stored. The input values and output values may be stored, for example, in the input/output hash table 220 illustrated in FIG. 2B.

At step 350, a frequent values list (FVL) statistic and/or a histogram statistic of output values of the UDF may be determined. The FVL statistic may be stored, for example, in the FVL table 230 illustrated in FIG. 2C. The histogram statistic may be stored, for example, in the histogram table 240 illustrated in FIG. 2D. At step 360, performance statistics for the UDF may be determined and stored. That is, statistics describing the system performance during the execution of the UDF may be determined, for example, by the UDF statistics engine 136 illustrated in FIG. 1. The performance statistics may be stored, for example, in the performance statistics table 250 illustrated in FIG. 2E. The steps 350 and 360 may be performed, for example, by the UDF statistics engine 136 illustrated in FIG. 1. After step 360, the method 300 terminates.

Figure 4:
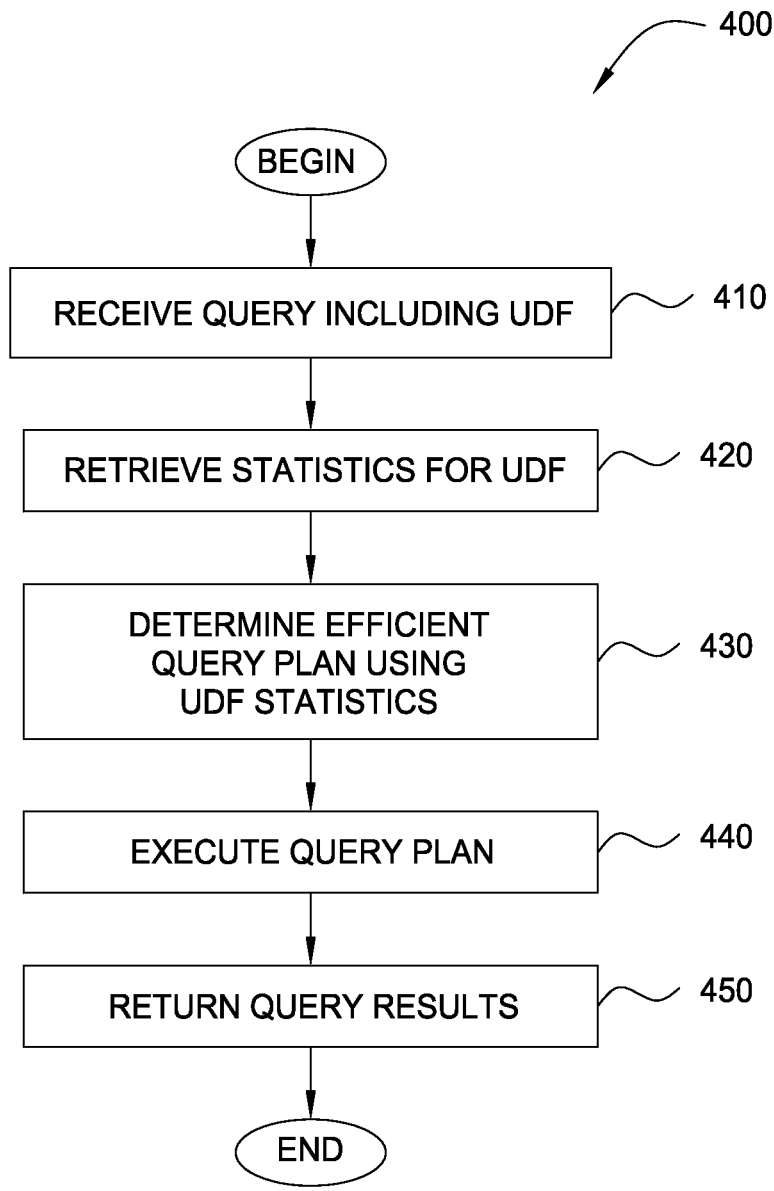
FIG. 4 is a flow diagram illustrating a method for optimizing a database query including a user-defined function, according to one embodiment of the invention.

FIG. 4 is a flow diagram illustrating a method 400 for optimizing a database query including a user-defined function, according to one embodiment of the invention. Persons skilled in the art will understand that, even though the method is described in conjunction with the systems of FIGS. 1-2, any system configured to perform the steps of method 400, in any order, is within the scope of the present invention.

The method 400 begins at step 410, when a database query including a user-defined function (UDF) is received. For example, a query including a UDF may be created by a user interacting with a query tool 108, and may be received by a DBMS 130 on a server system 120. At step 420, statistics describing the UDF may be retrieved. For example, UDF statistics may be retrieved from the UDF statistics 146. In one embodiment, the UDF statistics may be generated by use of the method 300 described above.

At step 430, the UDF statistics may be used to determine an efficient query plan for executing the query. For example, the query optimizer 134 (illustrated in FIG. 1) may use UDF statistics to determine an efficient query plan. At step 440, the determined query plan may be followed in order to execute the query. For example, the determined query plan may be carried out by the query engine 132 illustrated in FIG. 1. Optionally, the determined query plan may be saved for future use to execute similar queries (e.g., the same query but with different parameter values). At step 450, the query results may be returned. For example, the query results produced by query engine 132 according to the determined query plan may be presented to a user in the query tool 108. After step 450, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method for selecting a query plan for executing a database query containing a user-defined function, comprising:
    receiving the database query containing the user-defined function, wherein the database query includes at least one input value associated with the user-defined function;
    retrieving one or more predefined statistics describing the user-defined function, wherein the one or more predefined statistics include input values and output values of previous instances of executing the user-defined function, and wherein the one or more predefined statistics include a hash table relating the input values to the output values;
    selecting, based at least on the one or more predefined statistics, a query plan for executing the database query, wherein selecting a query plan for executing the database query comprises:
        upon determining that at least one cardinality of the hash table is equal to or greater than a threshold level, selecting a query plan that executes the user-defined function; and
        upon determining that the at least one cardinality of the hash table is less than the threshold level, selecting a query plan that retrieves at least one user-defined function output value from the hash table that corresponds to the at least one input value received with the database query; and
    outputting the selected query plan.

2. The computer-implemented method of claim 1, further comprising:
    executing the selected query plan; and
    returning a set of query results.

3. The computer-implemented method of claim 1, wherein the one or more predefined statistics are selected from a frequent values list statistic, a histogram statistic, and a cardinality statistic.

4. The computer-implemented method of claim 1, wherein the one or more predefined statistics are further based on one or more performance metrics, wherein each performance metric describes a measure of system performance during previous instances of executing the user-defined function.

5. The computer-implemented method of claim 4, wherein the one or more performance metrics describe at least one of a run time, a number of input/output operations, a CPU time, and memory usage.

6. The computer-implemented method of claim 1, wherein the one or more predefined statistics are further based on one or more external factors affecting execution of the user-defined function, and wherein the one or more external factors comprise at least one of: (i) an identifier for a user requesting the execution of the user-defined function, (ii) a date for the execution of the user-defined function, and (iii) a number of external jobs running on a host system.

7. The computer-implemented method of claim 1, wherein the one or more predefined statistics are classified according to one or more sources of data inputs to the user-defined function.

8. A computer readable storage medium containing a program which, when executed, performs an operation, comprising:
    receiving a database query containing a user-defined function, wherein the database query includes at least one input value associated with the user-defined function;
    retrieving one or more predefined statistics describing the user-defined function, wherein the one or more predefined statistics include input values and output values of previous instances of executing the user-defined function, and wherein the one or more predefined statistics include a hash table relating the input values to the output values;
    selecting, based at least on the one or more predefined statistics, a query plan for executing the database query, wherein selecting a query plan for executing the database query comprises:
        upon determining that at least one cardinality of the hash table is equal to or greater than a threshold level, selecting a query plan that executes the user-defined function; and
        upon determining that the at least one cardinality of the hash table is less than the threshold level, selecting a query plan that retrieves at least one user-defined function output value from the hash table corresponding to the at least one input value received with the database query; and
    outputting the selected query plan.

9. The computer readable storage medium of claim 8, wherein the operation further comprises:
    executing the selected query plan; and
    returning a set of query results.

10. The computer readable storage medium of claim 8, wherein the one or more predefined statistics are selected from a frequent values list statistic, a histogram statistic, and a cardinality statistic.

11. The computer readable storage medium of claim 8, wherein the one or more predefined statistics are further based on one or more performance metrics, wherein each performance metric describes a measure of system performance during previous instances of executing the user-defined function.

12. The computer readable storage medium of claim 11, wherein the one or more performance metrics describe at least one of a run time, a number of input/output operations, a CPU time, and memory usage.

13. The computer readable storage medium of claim 8, wherein the one or more predefined statistics are further based on one or more external factors affecting execution of the user-defined function, and wherein the one or more external factors comprise at least one of: (i) an identifier for a user requesting the execution of the user-defined function, (ii) a date for the execution of the user-defined function, and (iii) a number of external jobs running on a host system.

14. The computer readable storage medium of claim 8, wherein the one or more predefined statistics are classified according to one or more data inputs to the user-defined function.

15. A system, comprising:
a database;
a processor; and
a memory containing a program, which when executed by the processor is configured to provide a query plan for executing a database query containing a user-defined function, wherein the program is configured to:
receive the database query containing the user-defined function, wherein the database query includes at least one input value associated with the user-defined function;
retrieve one or more predefined statistics describing the user-defined function, wherein the one or more predefined statistics include input values and output values of previous instances of executing the user-defined function, and wherein the one or more predefined statistics include a hash table relating the input values to the output values;
select, based at least on the one or more predefined statistics, a query plan for executing the database query, wherein selecting a query plan for executing the database query comprises:
upon determining that at least one cardinality of the hash table is equal to or greater than a threshold level, selecting a query plan that executes the user-defined function; and
upon determining that the at least one cardinality of the hash table is less than the threshold level, selecting a query plan that retrieves at least one user-defined function output value from the hash table corresponding to the at least one input value received with the database query; and
output the selected query plan.

16. The system of claim 15, wherein the program is further configured to:
execute the selected query plan; and
return a set of query results.

17. The system of claim 15, wherein the one or more predefined statistics are selected from a frequent values list statistic, a histogram statistic, and a cardinality statistic.

18. The system of claim 15, wherein the one or more predefined statistics are further based on one or more performance metrics, wherein each performance metric describes a measure of system performance during previous instances of executing the user-defined function.

19. The system of claim 18, wherein the one or more performance metrics describe at least one of a run time, a number of input/output operations, a CPU time, and memory usage.

20. The system of claim 15, wherein the one or more predefined statistics are further based on one or more external factors affecting execution of the user-defined function, and wherein the one or more external factors comprise at least one of: (i) an identifier for a user requesting the execution of the user-defined function, (ii) a date for the execution of the user-defined function, and (iii) a number of external jobs running on a host system.

21. The system of claim 15, wherein the one or more predefined statistics are classified according to one or more data inputs to the user-defined function.

* * * * *